United States Patent
Braley et al.

(10) Patent No.: US 12,377,460 B1
(45) Date of Patent: Aug. 5, 2025

(54) SYSTEM AND METHOD FOR INVESTMENT CASTING AN OBJECT

(71) Applicant: The Boeing Company, Arlington, VA (US)

(72) Inventors: Daniel J. Braley, O'Fallon, MO (US); Elaine MacDonald, Wildwood, MO (US); Andrew Pfeiffer, Lake St. Louis, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/676,646

(22) Filed: May 29, 2024

(51) Int. Cl.
| | |
|---|---|
| B22D 25/02 | (2006.01) |
| B22C 9/02 | (2006.01) |
| B22D 37/00 | (2006.01) |
| B33Y 10/00 | (2015.01) |
| B33Y 30/00 | (2015.01) |
| B33Y 40/20 | (2020.01) |
| B33Y 50/02 | (2015.01) |
| B33Y 80/00 | (2015.01) |
| C04B 35/14 | (2006.01) |
| C04B 35/64 | (2006.01) |

(52) U.S. Cl.
CPC ............... *B22D 25/02* (2013.01); *B22C 9/02* (2013.01); *B22D 37/00* (2013.01); *B33Y 10/00* (2014.12); *B33Y 30/00* (2014.12); *B33Y 40/20* (2020.01); *B33Y 50/02* (2014.12); *B33Y 80/00* (2014.12); *C04B 35/14* (2013.01); *C04B 35/64* (2013.01); *C04B 2235/6026* (2013.01); *C04B 2235/612* (2013.01)

(58) Field of Classification Search
CPC ............ B22D 25/02; B22D 37/00; B22C 9/02
See application file for complete search history.

(56) References Cited

U.S. PATENT DOCUMENTS

| | | | | |
|---|---|---|---|---|
| 2015/0273577 | A1* | 10/2015 | Vader | B22F 12/53 164/513 |
| 2019/0126509 | A1* | 5/2019 | Gelbart | C04B 33/1315 |
| 2022/0305550 | A1* | 9/2022 | Lavi | B29C 64/40 |
| 2024/0100588 | A1* | 3/2024 | Rothaug | B33Y 80/00 |

FOREIGN PATENT DOCUMENTS

WO   WO-2021069719 A1 *  4/2021  ............... B22C 9/02

* cited by examiner

Primary Examiner — Keith Walker
Assistant Examiner — Steven S Ha
(74) Attorney, Agent, or Firm — Walters & Wasylyna LLC

(57) ABSTRACT

A method of making an object through investment casting includes additively manufacturing a mold for the object with a printing head on a carriage supported by a frame with the mold being additively manufactured from multiple layers on a build platform supported by the frame. An interior surface of the mold is machined with a machining device on the carriage after a predetermined number of layers have been added to the mold through additive manufacturing. The object is investment cast by directing a casting material into the mold while the mold is supported by the build platform.

20 Claims, 2 Drawing Sheets

SYSTEM AND METHOD FOR INVESTMENT CASTING AN OBJECT

FIELD

The present disclosure relates to a system and a method for investment casting, and in particular, to a system and method of generating a mold and investment casting an object from the mold.

BACKGROUND

Manufacturers can utilize a wide range of approaches to make an object. For example, objects can be made through a machining process that removes material from a blank or stock piece of material to obtain the object. Casting is an approach of making an object that utilizes a mold having an interior geometry that matches a profile of the object. The mold can be filled with a casting material and then removed to leave just the object. Another example approach utilized for making objects is through additive manufacturing. With additive manufacturing, the object is printed in multiple layers that accumulate to form the object. However, additive manufacturing has limits in terms of materials that can be printed, surface finish, and dimensional accuracy.

DESCRIPTION OF THE DRAWINGS

Some embodiments of the present disclosure are now described, by way of example only, and with reference to the accompanying drawings. The same reference number represents the same element or the same type of element on all drawings.

SUMMARY

Figure 1:
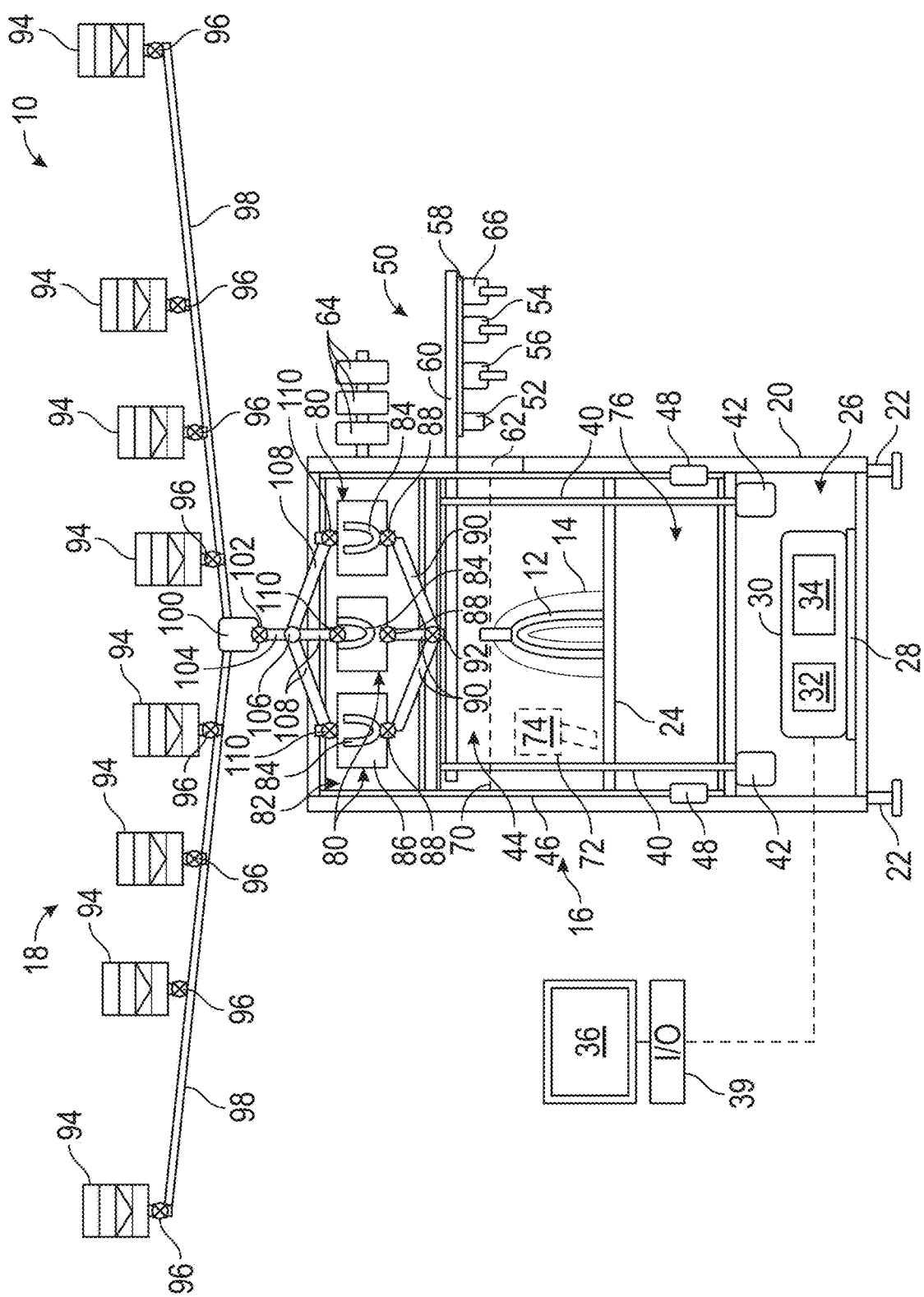
FIG. 1 illustrates an example hybrid assembly having an additive manufacturing portion and an investment casting portion.

Disclosed herein is a method of making an object through investment casting. The method includes additively manufacturing a mold for the object with a printing head on a carriage supported by a frame with the mold being additively manufactured from multiple layers on a build platform supported by the frame. An interior surface of the mold is machined with a machining device on the carriage after a predetermined number of layers have been added to the mold through additive manufacturing. The object is investment cast by directing a casting material into the mold while the mold is supported by the build platform.

In one or more embodiments, the method includes obtaining a CAD model for the object and generating a build file for additively manufacturing the mold by converting the CAD model into a shell that represents a surface geometry of the object.

In one or more embodiments, the build file divides the shell into a plurality of layers that each correspond to a printing thickness of the printing head.

In one or more embodiments, the method includes heating the build chamber with a heater to follow a predetermined material cure profile corresponding to a mold material prior to investment casting.

In one or more embodiments, the mold is comprised of a ceramic material and additively manufacturing the mold includes a fused deposition modeling process utilizing a ceramic stock material.

In one or more embodiments, the printing head includes a fused filament fabrication printing head configured to deposit the ceramic stock material.

In one or more embodiments, the mold is comprised of a sand-based material and additively manufacturing the mold includes a binder jet printing process utilizing a binder stock material.

In one or more embodiments, additively manufacturing the mold includes utilizing a spreader to spread a layer of a sand-based material corresponding to each of the plurality of layers of the mold.

In one or more embodiments, the printing head includes a binder jet printing head configured to deposit a binder stock material.

In one or more embodiments, investment casting the object includes directing at least one casting material from a feeder to a kiln supported by the frame.

In one or more embodiments, directing the at least one casting material includes directing a plurality of casting materials from a corresponding one of a plurality of feeders supported by the frame to a mixer prior to the casting materials reaching the kiln.

In one or more embodiments, the kiln includes a crucible located within a kiln chamber at least partially defined by the frame and the crucible includes an actuating floor for controlling a flow of casting material.

In one or more embodiments, investment casting the object includes positioning the build platform with the mold to align a mold inlet with an outlet of the kiln.

Disclosed herein is a hybrid investment casting assembly for making an object. The assembly includes a frame an additive manufacturing portion having at least one printing head attached by a carriage supported by the frame with at least one printing head configured to move along an X-Y plane and a build platform supported by the frame and configured to move along a Z-axis. The additive manufacturing portion also includes a machining device attached to the carriage and an actuated door configured to allow the carriage to translate in and out of a build chamber. An investment casting portion includes feeders supported by the frame and configured to direct a corresponding casting material into at least one kiln supported by the frame. The assembly also includes a controller configured to additively manufacture a mold for the object by directing a printing head on the carriage supported by the frame with the mold being additively manufactured from multiple layers on the build platform supported by the frame. The controller is also configured to machine an interior surface of the mold by directing a machining device on the carriage after a predetermined number of layers have been added to the mold through additive manufacturing and investment cast the object by directing a casting material into the mold while the mold is supported by the build platform.

In one or more embodiments, the assembly includes a mixer configured to receive the corresponding casting material prior to the corresponding casting material reaching at least one kiln.

In one or more embodiments, the controller is configured to heat the build chamber with a heater to follow a predetermined material cure profile corresponding to a mold material.

In one or more embodiments, the assembly includes a plurality of motors in driving engagement with one of a plurality of screw rods to move the build platform along the Z-axis.

In one or more embodiments, the at least one printing head includes a fused filament fabrication printing head configured to deposit a ceramic feed stock.

In one or more embodiments, the assembly includes a spreader configured to spread a powder material on the build platform and wherein the at least one printing head includes a binder jet printing head for distributing a binder stock material onto the powder material.

Disclosed herein is a non-transitory computer-readable storage medium embodying programmed instructions which, when executed by a processor, are operable for performing a method. The method includes additively manufacturing a mold for the object by directing a printing head on a carriage supported by a frame with the mold being additively manufactured from multiple layers on a build platform supported by the frame. An interior surface of the mold is machined by directing a machining device on the carriage after a predetermined number of layers have been added to the mold through additive manufacturing. The object is investment cast by directing a casting material into the mold while the mold is supported by the build platform.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

DESCRIPTION

The Figures and the following description illustrate specific exemplary embodiments of the disclosure. A person of ordinary skill in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below but by the claims and their equivalents.

FIG. 1 illustrates an example hybrid assembly 10, such as a hybrid investment casting assembly, for making an object 12. The hybrid assembly 10 generates the object 12 through an additive manufacturing assisted investment casting process. The hybrid assembly 10 can therefore generate a mold 14 for the object 12 through an additive manufacturing process and then perform an investment casting process with the additively manufactured mold 14 to generate a casting of the object 12. One feature of this disclosure is that the mold 14 can be created and the object can be cast without needing to relocate the mold 14. In particular, the mold 14 remains in the same location on a build platform 24 during both the additive manufacturing process and the investment casting process. Accordingly, the hybrid assembly 10 includes an additive manufacturing portion 16 to form the mold 14 and an investment casting portion 18 to cast the object 12 in the mold 14. Both the additive manufacturing portion 16 and the investment casting portion 18 are supported by a common frame 20 on adjustable feet 22 that can be relocated as needed.

The processes and methods disclosed herein can be performed by a computer system 30 on the hybrid assembly 10.

In the illustrated example, the computer system 30 can be located in a computer chamber 26 at least partially defined by the frame 20 and in thermal communication with a temperature regulator 28, such as a cold plate. The computer system 30 in FIG. 1 is depicted as a unitary computer module for illustrative simplicity. The computer system 30 can be physically embodied as one or more processing nodes having a non-transitory computer-readable storage medium 34, i.e., application-sufficient memory, and associated hardware and software, such as but not limited to a high-speed clock, timer, input/output circuitry, buffer circuitry, and the like. The computer-readable storage medium 34 may include enough read only memory, for instance magnetic or optical memory. Computer-readable code or instructions embodying the processes and methods described below may be executed during operation of the computer system 30. To that end, the computer system 30 may encompass one or more processors 32, e.g., logic circuits, application-specific integrated circuits (ASICs), central processing units, microprocessors, and/or other requisite hardware as needed to provide the programmed functionality described herein. A display screen 36 and input/output device (I/O) 39 may be connected to or in communication with the computer readable medium 34 and processor(s) 32 to facilitate a graphical interface for a user implementing this disclosure as set forth below.

In the illustrated example, the additive manufacturing portion 16 includes the build platform 24 that is supported by screw rods 40 driven by stepper motors 42 to change a vertical portion (Z-axis) of the build platform 24 during the additive manufacturing process. The additive manufacturing portion 16 is at least partially enclosed by a build chamber 44 within the frame 20. The build chamber 44 can be insulated with a ceramic fiber insulating blanket 46. A temperature of the build chamber 44 can be controlled through heaters 48, such as heat strips, to meet the need of the process occurring within the build chamber 44.

In the illustrated example, a carriage assembly 50 includes a first printing head 52, a second printing head 54, machining device 56 having a machining tool, and a vacuum each attached to a carriage 58. The carriage 58 is supported by a linear rail 60 that selectively controls movement of the carriage in at least one direction in an X-Y plane. The carriage 58 is moveable into and out of the build chamber 44 on the linear rail 60 depending on if the additive manufacturing process or the investment casting process is occurring. During the additive manufacturing process, the carriage 58 moves into the build chamber 44 through a door 62 to begin forming the mold 14 with the additive manufacturing process.

In the illustrated example, the carriage 58 includes both the first and second printing heads 52 and 54. However, only one of the printing heads 52 and 54 may be incorporated into the carriage 58. In one example, the first printing head 52 includes a fused filament fabrication (FFF) printing head for performing a fused deposition modeling (FDM) process. The first printing head 52 is connected to a ceramic stock material 64, such as a ceramic filament spool, resulting in the mold 14 being comprised of a ceramic material. Example ceramic stock material 64 can include white zirconia, alumina, or black zirconia. The first printing head 52 includes a heated nozzle that selectively emits the ceramic stock material 64 which hardens after leaving the nozzle. The ceramic stock material 64 can then be built up layer by layer with the first printing head 52 until the mold 14 is formed. A thickness of each layer corresponds to a printing thickness of the first printing head 52.

Because the mold 14 is printed from multiple layers stacked on top of each other, a casting surface on an interior of the mold 14 can include a stair-step profile that would transfer to the object 12 when cast. The resulting stair-step profile can be addressed by performing a surface treatment to the interior of the mold. In one example, the machining device 56 can perform at least one of a drilling or milling operation along multiple axes, such as three or five, with a corresponding machining tool to the interior casting surface of the mold 14.

As a predetermined number of layers are added to the mold 14 during the additive manufacturing process, the machining device 56 can be utilized to remove the stair-step profile. After utilizing the machining device 56, a vacuum 66 on the carriage 58 can extract debris from the interior of the mold 14 or an upper layer to ensure that the next layer printed adheres properly to the previous one. Alternatively, the vacuuming process can occur manually by an operator of the hybrid assembly 10.

Once the mold 14 has been completed, the mold 14 can be fired or cured if desired. The computer system 30 can direct the heaters 48 to heat the build chamber 44 to fire or cure the mold 14 by following a predetermined material cure profile corresponding to the ceramic stock material 64 utilized prior to investment casting. Example predetermined material cure profiles are discussed in greater detail below.

In one example, the ceramic stock material 64 includes Zirconia that is printed at a temperature of 180 degrees C. (−20 degrees C./+10 degrees C.) at a printing speed of 10-25 mm/s (0.39-0.98 in/s). When the ceramic stock material 64 is Zirconia, the finished mold is sintered within the build chamber 44 at a temperature of 1475 degrees C. (+/−50 degrees C.), at a ramp rate of 50 degrees C./hr (+/−10 degrees C./hr). The build chamber 44 temperature is then held at 1475 deg C. (+/−50 degrees C.) for 2 hours (+/−10 mins).

In another example, the ceramic stock material 64 includes Alumina that is printed at a temperature of 120 degrees C. (+/−10 degrees C.) at a printing speed of 20-35 mm/s (0.79-1.38 in/s). When the ceramic stock material 64 is Alumina, the finished mold is post sintered within the build chamber 44 at a temperature of 1550 degrees C. (+/−50 degrees C.), at a ramp rate of 50 degrees C./hr (+/−10 deg C./hr). The build chamber 44 temperature is then held at 1550 degrees C. (+/−50 deg C.) for 2 hours (+/−10 mins).

In yet another example, the mold casting material 64 includes a Liquid Ceramic Mix having 62% (+/−5%) ceramic investment powder and 38% (+/−5%) water with the ceramic in the Liquid Ceramic Mix having 25-40% gypsum and 60-75% silica.

In the illustrated example, the second printing head 54 can include a binder jet printing head for binding a sand-based material that results in the mold 14 being sand-based. If the second printing head 54 is being used, enclosure walls 70 (shown in dashed lines) are fixed to each side of the build platform 24 to create an enclosed space for spreading layers of a sand-based material. Each layer of sand is spread to a predetermined thickness with a spreader 72, such as a roller or blade, in communication with a hopper 74 for storing a powder, such as the sand-based material, to be spread. The second printing head 54 can then apply a binding agent to the sand after each layer is formed by the spreader 72 until the entire mold 14 is formed.

Similar to the process with the first printing head 52, the machining device 56 can be used on the mold 14 when formed from the binder jet printing process to perform a surface treatment process. The surface treatment process removes the stair-step profile that can form in an interior surface of the mold 14. In one example, prior to using the machining device 56 on the interior surface of the mold 14, the vacuum 66 can be used to remove sand from within the mold 14. After the surface treatment process has been performed, the spreader 72 can then apply additional sand in the area of the machining. This ensures that the next layer of sand applied by the spreader 72 will be consistent and not have recesses in the areas where the sand was extracted by the vacuum 66.

Once the mold 14 has been completed with the sand and the binder jet process, the vacuum 66 can be used to remove the sand from the interior of the mold 14. Alternatively, the sand in the interior of the mold 14 can be removed manually by an operator of the hybrid assembly 10. Furthermore, the sand surrounding the mold 14 can be removed to allow access to inlets of the mold 14 and the remainder of the sand can remain surrounding the mold. One feature of allowing the remainder of the sand to surround the mold is improved thermal protection for the rest of the hybrid assembly 10 during the investment casting process as described in greater detail below. Additionally, a chamber 76 below the build platform 24 can be filled with sand to provide an additional thermal barrier between the investment casting process and the computer system 30.

Once the mold 14 has been prepared using one of the approaches described above, the investment casting process with the investment casting portion 18 of the hybrid assembly 10 can begin. In the illustrated example, the investment casting portion 18 includes a multiple kilns 80 located within a kiln chamber 82 that is least partially defined by the frame 20. The kiln chamber 82 is surrounded by a ceramic fiber insulating blanket to shield the frame 20 from the heat generated by the kilns 80.

In the illustrated example, there are three kilns 80 that each include a separate crucible 84 surrounded by a ceramic brick insulation 86. One feature of having multiple kilns 80 each with separate crucibles 84 is a reduction in cross contamination between casting materials that are used to cast the object 12. The release of material from each of the kilns 80 is controlled by a valve 88 that can be selectively opened and closed to direct the casting material into a corresponding fluid passageway 90 by gravity. In the illustrated example, each of the fluid passageways 90 are connect into a single outlet valve 92 that controls the flow of the casting material into the mold 14. Before the outlet valve 92 is opened, the build platform 24 is moved vertically to align an inlet to the mold 14 with the outlet valve 92.

In the illustrated example, a casting material is selectively fed by one of the feeders 94. Each of the feeders 94 include a feed cavity for storing a corresponding one of the casting materials and an outlet valve 96 for metering the casting material from the feeder 94 and into a feed passageway 98. From the feed passageway 98, the casting material is received by a circular mixer 100 that is configured to provide a uniform mixture of the casting materials prior to being directed into one of the kilns 80. The release of the mixed feed material from the circular mixer 100 is controlled by an outlet valve 102 that directs the mixture of feed material through a passageway 104 to a directional valve 106. The directional valve 106 directs the mixture of feed material to the correct one of the crucibles 84 for heating through one of the passageways 108. An outlet valve 110 is located at the end of each of the passageways 108 to further control the flow of casting material into the crucibles 84.

The liquid or molten casting material can then be released from a corresponding one of the crucibles 84 by opening one of the valves 88 and directing the material into a corresponding one of the passageways 90 to an outlet valve 92 as described above.

In one example, the casting material includes Bromine Intercalated Highly Pyrolytic Graphite in 500A Copper that is heated in the crucible to 985 deg C. (+/−10 deg C.). The Bromine Intercalated Highly Pyrolytic Graphite material in 500A Copper is highly softened at the above temperature but is kept under the molten state (approximately 1085 deg C.) such that it is gravity fed out of the heated crucible 84 into the mold 14 in order to retain superconductivity.

Figure 2:
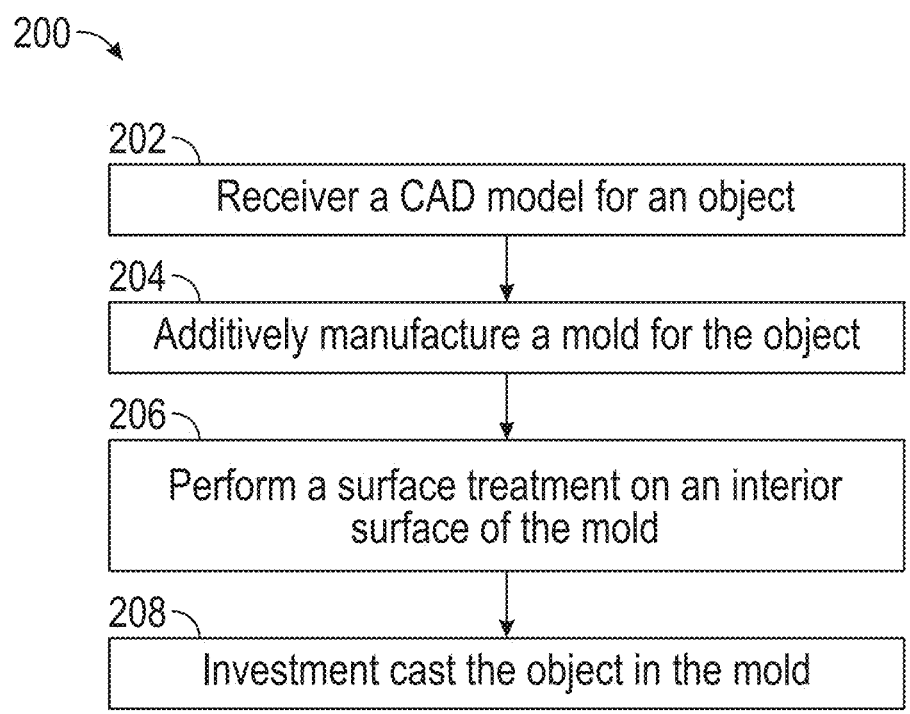
FIG. 2 illustrates an example method of making an object utilizing the hybrid assembly of FIG. 1.

FIG. 2 illustrates an example method 200 of making an object through investment casting with the hybrid assembly 10. The method 200 begins at Block 202 by receiving a CAD model for an object 12 to be cast from the hybrid assembly 10 with the method disclosed herein. With the CAD model of the object, the method 200 can generate a build file for the object 12 for additively manufacturing the mold 14 for the object 12.

In one example, the build file for the mold 14 is generated by converting the CAD model of the object 12 to a shell model, or surface geometry, of the object 12. The shell defines an interior surface the mold 14 for investment casting. The shell can be divided into a number of layers corresponding to a thickness of the printing during the additive manufacturing process. The shell model with plurality of layers can then be converted into tool paths for one of the printing heads 52 or 54 depending on the type of additive manufacturing being used. The tool paths define in an X-Y plane or coordinate system to move the carriage 58 with a corresponding one of the first or second printing heads 52 and 54. The build platform 24 can then be selectively moved along the Z-axis by an amount that corresponds to a thickness of each layer of the mold. The above instructions form the basis of a build file stored on the computer system 30 that is used to direct the additive manufacturing portion 16 of the hybrid assembly 10 at Block 204.

At Block 204, the method 200 begins additively manufacturing the mold 14 through the computer system 30 executing the instructions from the build file. For the example of the first printing head 52 being used to additively manufacture the mold 14, ceramic stock material 64 is heated and extruded through a nozzle on the first printing head 52 directly onto the build platform 24 in the case of the first layer and then onto each successive layer of the mold 14. This process continues until the entire mold 14 is formed. For the example of the second printing head 54 being used to additively manufacture the mold 14, as each layer of sand is spread with the spreader 72, the second printing head 54 emits a binder material into that layer that solidifies after being absorbed to form the mold 14 on the build platform 24.

While the mold 14 is being formed at Block 206, a surface treatment process can occur on the internal surface of the mold 14 that defines the surface geometry of the object 12. In one example, the surface treatment process includes utilizing the machining device 56 on the carriage 58. The machining device 56 can perform a drilling or milling process with a machining tool on the interior surface of the mold 14 after a predetermined number of layers of the mold 14 are formed by the additive manufacturing process as described above. The number of layers that can be formed between performing the surface treatment process is dependent on a geometry of the interior surface of the mold 14 and a size of the machine tool used by the machining device 56. One feature of performing the surface treatment process is to remove the stair-step profile in the interior surface of the mold 14 that can result from each layer formed by the additive manufacturing process as described above.

Additionally, the surface treatment process can include cleaning the mold 14 after utilizing the machining device 56 to remove debris that may have accumulated in the mold 14. This prevents the debris from interfering with the additive manufacturing process for the rest of the mold 14 as described above.

When the surface treatment process is being performed with the second printing head 54, the vacuum 66 may be used to clean an interior region of the mold 14 from sand such that the machining device 56 can have access to the interior surface of the mold 14. Alternatively, the vacuuming can be done manually by an operator of the hybrid assembly 10. As described above, the spreader 72 may need to take additional actions to ensure that the region cleared for the machining device 56 is evenly filled before the binder stock material can be used to solidify the next layer of the mold 14. After the machining is completed, the method 200 proceeds to Block 206.

At Block 208, the method 200 performs the investment casting process utilizing the mold 14 that was made from the additive manufacturing process at Block 204. The investment casting process performed at Block 208 can begin by combining various casting materials from the feeders 94. The casting material can be metered using valves 96 that are controlled by the computer system 30. The metered casting material is then collected in the mixer 100 to generate a mixture of the various casting materials. The mixture is then directed to one of the crucibles in the kilns 80 for transforming it into a molten or liquid form for casting.

The build platform 24 can then be positioned to align the outlet valve 92 with an inlet to the mold 14. One feature of utilizing the hybrid assembly 10, is that the mold 14 can be additively manufactured on the build platform 24 without needing to be relocated prior to investment casting. Additionally, the method 200 accomplishes this by determining where to build the mold 14 on the build platform 24 such that the inlet to the mold 14 can be aligned with the outlet valve 92 without relocating the mold 14 relative to the build platform 24.

Once the object 12 has been cast at Block 208, it can be removed from the mold 14 in preparation for receiving additional machining or processing before reaching its final form.

The following Clauses provide example configurations of an example system and method of investment casting.

Clause 1: A method of making an object through investment casting, the method comprising: additively manufacturing a mold for the object with a printing head on a carriage supported by a frame, wherein the mold is additively manufactured from a plurality of layers on a build platform supported by the frame; machining an interior surface of the mold with a machining device on the carriage after a predetermined number of layers have been added to the mold through additive manufacturing; and investment casting the object by directing a casting material into the mold while the mold is supported by the build platform.

Clause 2: The method of clause 1, includes obtaining a CAD model for the object and generating a build file for additively manufacturing the mold by converting the CAD model into a shell that represents a surface geometry of the object.

Clause 3: The method of clauses 1-2, wherein the build file divides the shell into a plurality of layers that each correspond to a printing thickness of the printing head.

Clause 4: The method of clauses 1-3, includes heating the build chamber with a heater to follow a predetermined material cure profile corresponding to a mold material prior to investment casting.

Clause 5: The method of clauses 1-4, wherein the mold is comprised of a ceramic material and additively manufacturing the mold includes a fused deposition modeling process utilizing a ceramic stock material.

Clause 6: The method of clauses 1-5, wherein the printing head includes a fused filament fabrication printing head configured to deposit the ceramic stock material.

Clause 7: The method of clauses 1-6, wherein the mold is comprised of a sand-based material and additively manufacturing the mold includes a binder jet printing process utilizing a binder stock material.

Clause 8: The method of clauses 1-7, wherein additively manufacturing the mold includes utilizing a spreader to spread a layer of the sand-based material corresponding to each of the plurality of layers of the mold.

Clause 9: The method of clauses 1-8, wherein the printing head includes a binder jet printing head configured to deposit a binder stock material.

Clause 10: The method of clauses 1-9, wherein investment casting the object includes directing at least one casting material from a feeder to a kiln supported by the frame.

Clause 11: The method of clauses 1-10, wherein directing the at least one casting material includes directing a plurality of casting materials from a corresponding one of a plurality of feeders supported by the frame to a mixer prior to the casting materials reaching the kiln.

Clause 12: The method of clauses 1-11, wherein the kiln includes a crucible located within a kiln chamber at least partially defined by the frame and the crucible includes an actuating floor for controlling a flow of casting material.

Clause 13: The method of clauses 1-12, wherein investment casting the object includes positioning build platform with the mold to align a mold inlet with an outlet of the kiln.

Clause 14: A hybrid investment casting assembly for making an object, the assembly comprising: a frame; an additive manufacturing portion including: at least one printing head attached to a carriage and supported by the frame with the at least one printing head configured to move along an X-Y plane; a build platform supported by the frame and configured to move along a Z-axis; a machining device attached to the carriage; and an actuated door to allow the carriage to translate in and out of a build chamber; an investment casting portion including a plurality of feeders supported by the frame and configured to direct a corresponding casting material into at least one kiln supported by the frame; and a controller configured to: additively manufacture a mold for the object by directing a printing head on a carriage supported by a frame, wherein the mold is additively manufactured from a plurality of layers on a build platform supported by the frame; machine an interior surface of the mold by directing a machining device on the carriage after a predetermined number of layers have been added to the mold through additive manufacturing; and investment cast the object by directing a casting material into the mold while the mold is supported by the build platform.

Clause 15: The assembly of clause 14, including a mixer configured to receive each of the corresponding casting materials prior to each of the corresponding casting materials reaching at least one kiln.

Clause 16: The assembly of clauses 14-15, wherein the controller is configured to heat the build chamber with a heater to follow a predetermined material cure profile corresponding to a mold material.

Clause 17: The assembly of clauses 14-16, including a plurality of motors in driving engagement with one of a plurality of screw rods to move the build platform along the Z-axis.

Clause 18: The assembly of clauses 14-17, wherein the at least one printing head includes a fused filament fabrication printing head configured to deposit a ceramic feed stock.

Clause 19: The assembly of clauses 14-18, including a spreader configured to spread a powder material on the build platform and wherein the at least one printing head includes a binder jet printing head for distributing a binder stock material onto the powder material.

Clause 20: A non-transitory computer-readable storage medium embodying programmed instructions which, when executed by a processor, are operable for performing a method comprising: additively manufacturing a mold within a build chamber for an object by directing a printing head on a carriage supported by a frame, wherein the mold is additively manufactured from a plurality of layers on a build platform supported by the frame; machining an interior surface of the mold by directing a machining device on the carriage after a predetermined number of layers have been added to the mold through additive manufacturing; heating the build chamber with a heater to follow a predetermined material cure profile corresponding to a mold material; and investment casting the object by directing a casting material into the mold while the mold is supported by the build platform.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

What is claimed is:

1. A method of making an object through investment casting, the method comprising:
additively manufacturing a mold for the object with a printing head on a carriage supported by a frame, wherein the mold is additively manufactured from a plurality of layers on a build platform supported by the frame;

machining an interior surface of the mold with a machining device on the carriage after a predetermined number of layers have been added to the mold through additive manufacturing; and investment casting the object by directing a casting material from a feeder to a kiln supported by the frame and into the mold while the mold is supported by the build platform.

2. The method of claim 1, including obtaining a CAD model for the object and generating a build file for additively manufacturing the mold by converting the CAD model into a shell that represents a surface geometry of the object.

3. The method of claim 2, wherein the build file divides the shell into a plurality of layers that each correspond to a printing thickness of the printing head.

4. The method of claim 1, including heating a build chamber with a heater to follow a predetermined material cure profile corresponding to a mold material prior to investment casting.

5. The method of claim 1, wherein the mold is comprised of a ceramic material and additively manufacturing the mold includes a fused deposition modeling process utilizing a ceramic stock material.

6. The method of claim 5, wherein the printing head includes a fused filament fabrication printing head configured to deposit the ceramic stock material.

7. The method of claim 1, wherein the mold is comprised of a sand-based material and additively manufacturing the mold includes a binder jet printing process utilizing a binder stock material.

8. The method of claim 7, wherein additively manufacturing the mold includes utilizing a spreader to spread a layer of the sand-based material corresponding to each of the plurality of layers of the mold.

9. The method of claim 8, wherein the printing head includes a binder jet printing head configured to deposit a binder stock material.

10. The method of claim 1, wherein directing the at least one casting material includes directing a plurality of casting materials from a corresponding one of a plurality of feeders supported by the frame to a mixer prior to the casting materials reaching the kiln.

11. The method of claim 1, wherein the kiln includes a crucible located within a kiln chamber at least partially defined by the frame and the crucible includes an actuating floor for controlling a flow of casting material.

12. The method of claim 1, wherein investment casting the object includes positioning the build platform with the mold to align a mold inlet with an outlet of the kiln.

13. A hybrid investment casting assembly for making an object, the assembly comprising:
a frame;
an additive manufacturing portion including:
at least one printing head attached to a carriage and supported by the frame with the at least one printing head configured to move along an X-Y plane;
a build platform supported by the frame and configured to move along a Z-axis;
a machining device attached to the carriage; and
an actuated door to allow the carriage to translate in and out of a build chamber;
an investment casting portion including a feeder supported by the frame and configured to direct a casting material into a kiln supported by the frame; and
a controller configured to:
additively manufacture a mold for the object by directing a printing head on the carriage supported by the frame, wherein the mold is additively manufactured from a plurality of layers on the build platform supported by the frame;
machine an interior surface of the mold by directing a machining device on the carriage after a predetermined number of layers have been added to the mold through additive manufacturing; and
investment cast the object by directing the casting material into the mold while the mold is supported by the build platform.

14. The assembly of claim 13, wherein the controller is configured to heat the build chamber with a heater to follow a predetermined material cure profile corresponding to a mold material.

15. The assembly of claim 13, including a plurality of motors in driving engagement with one of a plurality of screw rods to move the build platform along the Z-axis.

16. The assembly of claim 13, wherein the at least one printing head includes a fused filament fabrication printing head configured to deposit a ceramic feed stock.

17. The assembly of claim 13, including a spreader configured to spread a powder material on the build platform and wherein the at least one printing head includes a binder jet printing head for distributing a binder stock material onto the powder material.

18. The assembly of claim 13, further comprising a plurality of feeders supported by the frame and configured to direct a plurality of casting materials to the kiln.

19. The assembly of claim 18, further comprising a mixer configured to receive a casting material prior to the casting material reaching the kiln.

20. The assembly of claim 13, wherein the at least one printing head includes a binder jet printing head configured to deposit a binder stock material.

* * * * *